United States Patent
Charny et al.

(10) Patent No.: US 7,567,572 B1
(45) Date of Patent: *Jul. 28, 2009

(54) 2-RATE SCHEDULING BASED ON SEARCH TREES WITH CONFIGURABLE EXCESS BANDWIDTH SHARING

(75) Inventors: Anna Charny, Sudbury, MA (US); Robert Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

This patent is subject to a terminal disclaimer.

(21) Appl. No.: 10/754,970

(22) Filed: Jan. 9, 2004

(51) Int. Cl.
*H04L 12/56* (2006.01)
*H04J 3/22* (2006.01)

(52) U.S. Cl. ............... 370/395.4; 370/412; 370/468

(58) Field of Classification Search ........... 370/395.21, 370/395.4, 395.41–395.43, 411–418, 229–230, 370/230.1, 468
See application file for complete search history.

(56) References Cited

U.S. PATENT DOCUMENTS

| | | | |
|---|---|---|---|
| 5,864,540 A | 1/1999 | Bonomi et al. | |
| 6,130,878 A | 10/2000 | Charny | |
| 6,408,005 B1 | 6/2002 | Fan et al. | |
| 6,556,571 B1 * | 4/2003 | Shahrier et al. | 370/395.4 |
| 6,560,230 B1 * | 5/2003 | Li et al. | 370/395.42 |
| 6,721,325 B1 * | 4/2004 | Duckering et al. | 370/395.4 |
| 6,922,732 B2 * | 7/2005 | Elmaliach et al. | 709/240 |
| 7,006,513 B1 * | 2/2006 | Ali et al. | 370/414 |
| 7,065,048 B1 * | 6/2006 | Levy et al. | 370/230.1 |
| 7,257,127 B1 * | 8/2007 | Cankaya | 370/459 |
| 2005/0207419 A1 * | 9/2005 | Kohzuki et al. | 370/392 |

OTHER PUBLICATIONS

Jon C.R. Bennett et al., "Hierarchical Packet Fair Queuing Algorithms", IEEE ACM Transactions on Networking, 5(5), pp. 675-689, Oct. 1997.
T. Cormen et al., "Introduction to Algorithms", The MIT Press, Chapter 9, 1990.
J.D. Foley et al., "Computer Graphics: Principles and Practice", Addison-Wesley, 1990, pp. 74-80.
S.J. Golestani, "A Self-Clocked Fair Queuing Scheme for Broadband Applications", Proc. INFOCOM'94, pp. 636-646, Apr. 1994.
P. Goyal et al., "Start-time fair queuing: a scheduling algorithm for integrated services packet switching networks", Proc. Sigcomm, 1996.
Chris Kappler et al., "HQF Implementation Based on Sorting Trees (HIST)", Cisco Systems, Doc. No. EDCS-273780—rev 3.9, pp. 1-123.
S. Keshav et al., "An Engineering Approach to Computer Networking", Addison-Wesley, Chapter 9, 1997.

(Continued)

*Primary Examiner*—Wing F Chan
*Assistant Examiner*—Saba Tsegaye
(74) *Attorney, Agent, or Firm*—Cindy Kaplan (57) ABSTRACT

Systems and methods for two-rate scheduling over a class hierarchy wherein controlled rates are delivered in a smooth manner, even over short time intervals. A minimum rate scheduler and an excess rate scheduler are employed. The minimum rate scheduler and/or the excess rate scheduler, employ special binary search trees to make selections at each parent node in the class hierarchy.

25 Claims, 6 Drawing Sheets

OTHER PUBLICATIONS

J-Y Leboudec et al., "A Short Tutorial On Network Calculus I: Fundamental Bounds in Communication Networks", Proceedings ISCAS2000, Geneva, Switzerland, May 2000.

W. Leland et al., "On the Self-Similar Nature of Ethernet Traffic", SIGCOMM'93, pp. 183-193; 1993.

A.K.J. Parekh, "A Generalized Processor Sharing Approach to Flow Control in Integrated Services Networks", Ph.D. thesis, Massachusetts Institute of Technology, Feb. 1992.

M. Roughan et al., "Measuring long-range dependence under changing traffic conditions", in Proc. IEEE INFOCOM'99, New York, NY, Mar. 1999, pp. 338-341.

Ion Stoica et al., "Earliest Eligible Virtual Deadline First: A Flexible and Accurate Mechanism for Proportional Share Resource Allocation", Department of Computer Science, Old Dominion University, Norfolk, Virginia, TR-95-22, Jan. 26, 1996, pp. 1-37.

Ion Stoica et al., "An Efficient Packet Service Algorithm for High Speed ATM Switches", Department of Computer Science, Old Dominion University, Norfolk, Virginia, pp. 1-24.

K. Thompson et al., "Wide-Area Internet Traffic Patterns and Characteristics", IEEE/ACM Transactions on Networking, pp. 10-23, Nov. 1997.

T. Tuan et al., "Multiple Time Scale Congestion Control for Self-Similar Network Traffic", Performance Evaluation, 36:359-386, 1999.

\* cited by examiner

FIG. 6

2-RATE SCHEDULING BASED ON SEARCH TREES WITH CONFIGURABLE EXCESS BANDWIDTH SHARING

STATEMENT OF RELATED APPLICATIONS

The present application is related to the subject matter of the following U.S. Patent Applications, U.S. patent application Ser. No. 10/357,878, filed on Feb. 4, 2003, entitled SCHEDULING SYSTEM AND METHOD FOR MULTI-LEVEL CLASS HIERARCHY (U.S. Pat. No. 7,385,987); U.S. patent application Ser. No. 10/243,436, filed on Sep. 13, 2002, entitled RATE-BASED SCHEDULING METHOD AND SYSTEM (U.S. Pat. No. 7,231,425); and U.S. patent application Ser. No. 10/446,597, filed on May 28, 2003, entitled METHODS AND APPARATUS FOR SCHEDULING TASKS (U.S. Pat. No. 7,372,857). The contents of these related patent applications are herein incorporated by reference in their entirety for all purposes.

BACKGROUND OF THE INVENTION

The present invention relates to systems and methods for scheduling resources such as, e.g., packet transmission resources.

High speed networks are designed to carry services with a wide range of traffic characteristics and quality-of-service (QoS) requirements. A common task for rate-based QoS enabled scheduling is ensuring that each of multiple queues is guaranteed a minimum rate, excess bandwidth is shared in accordance with predefined weights, each queue does not exceed a specified maximum rate, and the link is maximally utilized within the maximum rate constraints.

It is further desirable to extend rate-based scheduling to a class hierarchy where the above-described rates are configured in a hierarchical fashion. Such a class hierarchy may be represented as a tree of nodes. The root node would then correspond to the physical interface, nodes of the next layer would correspond to a logical interface, and a third layer might correspond to particular client. Each node is expected to be served by its parent node at least at its configured minimum service rate and up to its maximum configured rate. The excess service that can be given to a node above and beyond its minimum rate is desirably proportional to its specified excess bandwidth sharing weight relative to the weights of its active non-empty peers that are simultaneously vying for excess service.

One known way to schedule in accordance with class hierarchy requirements is to employ essentially two scheduling systems, a minimum rate scheduler and an excess weight scheduler. Each node has an associated queue. For the leaf nodes of the tree, the queues are actual packet queues. For higher layer nodes, the queues are logical queues. The minimum rate scheduler only considers queues that are not exceeding their minimum rates. The excess rate scheduler considers ones of the remaining queues that are not exceeding their maximum rates. At each scheduling opportunity, the minimum rate scheduler is invoked if it has a non-empty queue to schedule; otherwise a queue is selected by the maximum rate scheduler.

A problem with this approach is that, due to the passage of time, many queues may return simultaneously, or nearly simultaneously, to eligibility for consideration by the minimum rate scheduler. Correctly returning newly eligible queues to the minimum rate scheduler, however, requires O(N) complexity where N is the number of returning queues.

The above-cited application entitled "Scheduling System and Method for Multi-Level Class Hierarchy" solves this problem by providing that ineligible queues remain in consideration by the minimum rate scheduler. When the minimum rate scheduler selects an ineligible queue, its token bucket is updated and its eligibility is reconsidered. However, if it remains ineligible, the scheduling opportunity is given to the maximum rate scheduler which only considers queues that currently exceed their configured minimum rates. In this way, each ineligible queue is guaranteed to have its eligibility considered at least every 1/R time units.

A shortcoming of the approach described in the cited patent application is that it delivers service in a bursty fashion in some scenarios. Underlying the two schedulers are respective calendar queues operative at each parent node in the hierarchy. The calendar queues provide an efficient implementation structure, but have some intrinsic inaccuracy in their scheduling among the queues of children nodes. The inaccuracy may result in a late return to eligibility for a node queue that has in fact already fallen below its minimal rate. Once the calendar queue gets around to returning this queue to eligibility, its packets will tend to be serviced consecutively to balance out the previous underservicing. The result is bursts of traffic from the various queues and poor rate control over short periods of time.

What is needed are systems and methods for operating a two-rate scheduler such that rate control is delivered in a smooth manner and rates remain controlled even over relatively short time intervals.

SUMMARY OF THE INVENTION

Embodiments of the present invention provide systems and methods for two-rate scheduling over a class hierarchy wherein controlled rates are delivered in a smooth manner, even over short time intervals. A minimum rate scheduler and an excess rate scheduler are employed. The minimum rate scheduler and/or the excess rate scheduler, employ special binary search trees to make selections at each parent node in the class hierarchy.

One aspect of the present invention provides a scheduling method for a multi-level class hierarchy having a plurality of layers, each layer containing a plurality of queues. The method includes: inserting all queues containing at least one packet in a first scheduler, inserting, into the second scheduler queues contained in the first scheduler that do not exceed their maximum rate, dequeuing from the first scheduler until a queue exceeding a maximum rate of the queue is reached, and dequeuing from a second scheduler when a queue exceeding a maximum rate of the queue is reached in the first scheduler. The first scheduler employs a first binary search tree to make a dequeuing selection.

Further understanding of the nature and advantages of the inventions herein may be realized by reference to the remaining portions of the specification and the attached drawings.

DESCRIPTION OF SPECIFIC EMBODIMENTS

In one implementation, the present invention operates in the context of a data communication network including multiple network elements. Some of the elements in a network that employs the present invention may be network devices such as routers and switches. A scheduler system of the present invention is located in one or more of the network elements. However, the present invention is not limited to this particular type of environment.

The scheduling system is used to schedule a number of packet queues (q(1), q(2), ... q(N)) with a goal of ensuring that each queue q(i) is guaranteed a specified minimum rate R(i) and at the same time limiting the transmission rate from this queue to another specified maximum rate M(i). The system is configured such that for any packet queue q(i), R(i) is less than or equal to M(i) and the sum of R(i) over all i=1, 2 . . . N does not exceed the speed of the link. Also, once all queues have reached their minimum, it is desirable that available transmission resources should be shared in accordance with excess sharing weights E(i). Similar parameters are configured for logical queues that operate at higher levels of a multi-level scheduling hierarchy.

Figure 1:
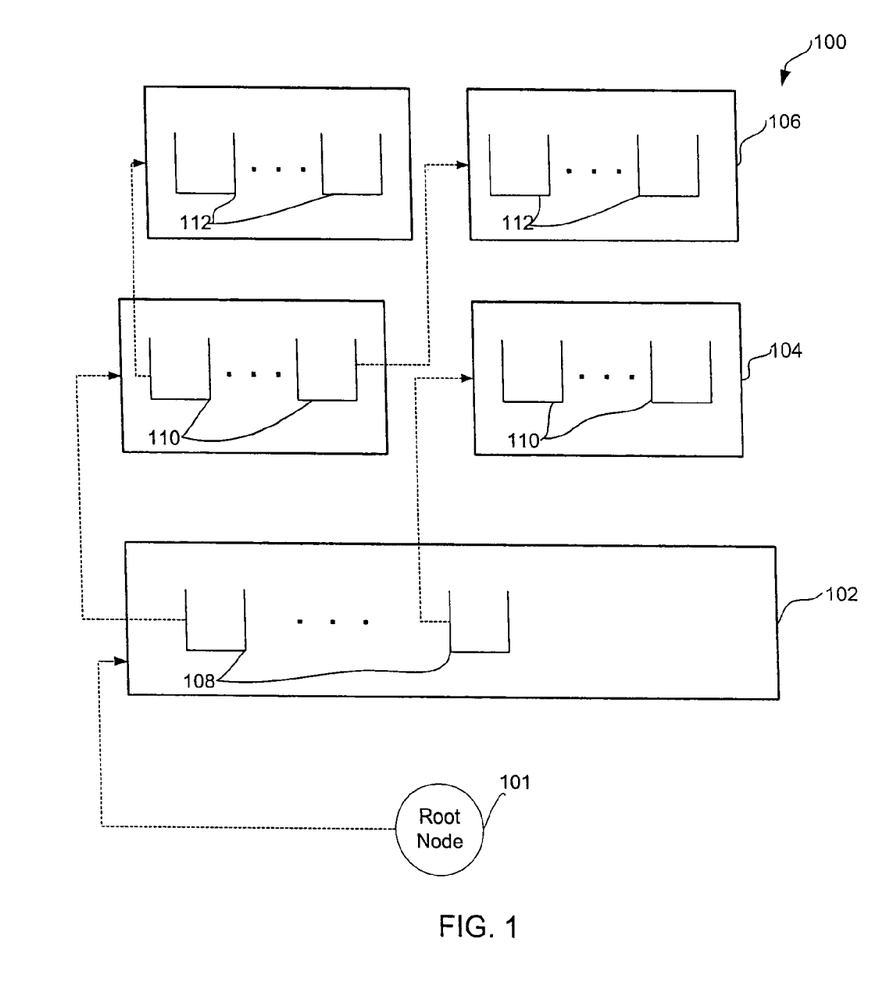
FIG. 1 depicts a scheduling hierarchy according to one embodiment of the present invention.

Referring now to FIG. 1, a block diagram illustrating a multi-level scheduling hierarchy 100 is shown. The hierarchy shown in FIG. 1 includes a root node 101 and three layers 102, 104, 106, however, it is to be understood that the system described herein may be used with any number of layers or queues. The root node 101 corresponds to a physical interface (e.g., an Ethernet or POS interface), and the first layer includes a plurality of queues 108 that may represent, for example, logical ports. The second layer represents children of the logical ports, with each second layer node representing, for example, individual clients utilizing that logical port. The third layer includes queues 112 (shown only for two queues of the second layer queues 108) having data which is broken down even further (e.g., individual client applications). In the following description, a parent layer is defined as the next layer toward the root (i.e., the parent of layer 104 is layer 102; layer 104 is the child of layer 102).

Figure 2:
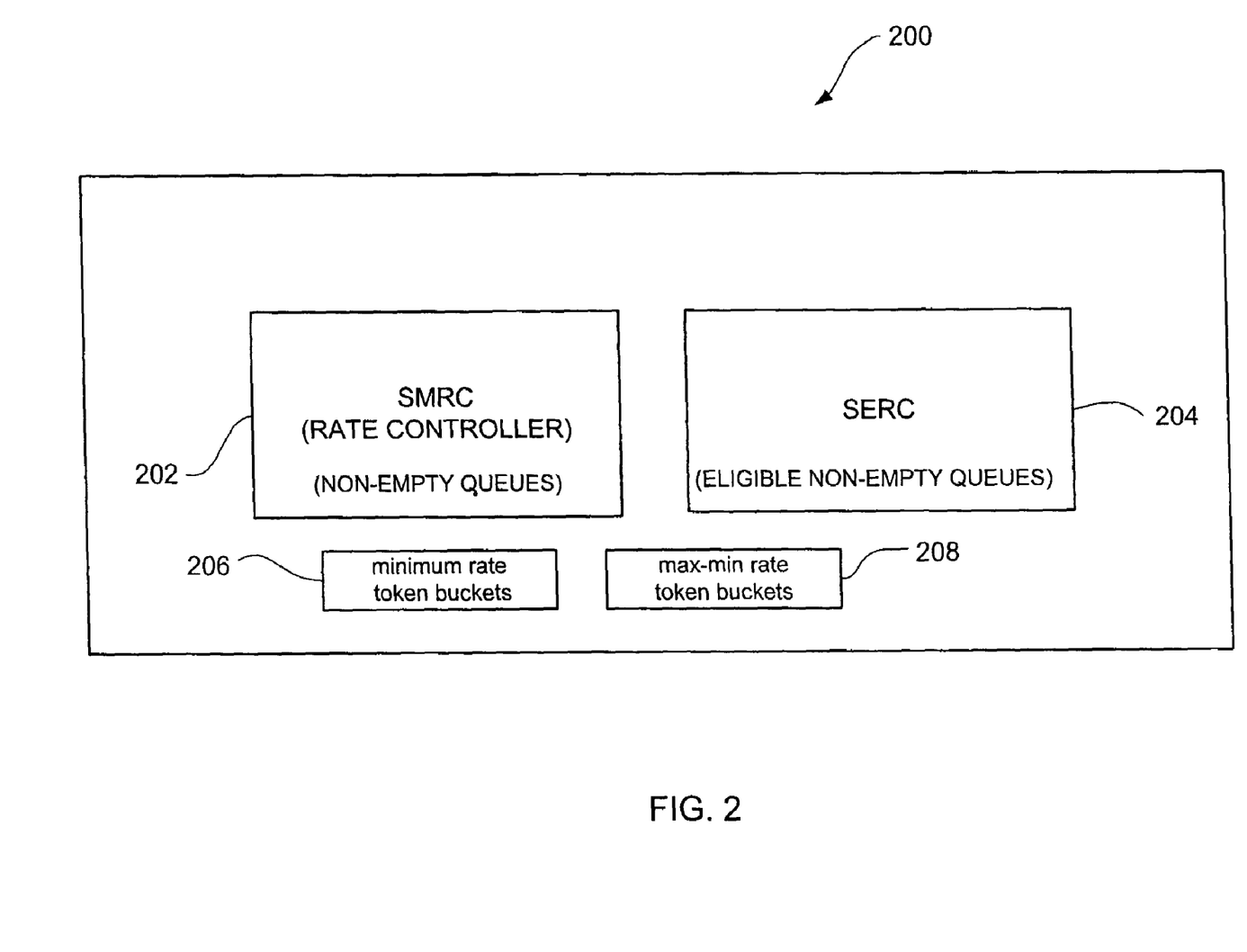
FIG. 2 depicts a two-rate scheduling system according to one embodiment of the present invention.

A scheduling system according to one embodiment of the present invention includes two schedulers, one configured to ensure a minimum rate guarantee, while the other is used for sharing excess bandwidth. Referring now to FIG. 2, a scheduling system 200 includes two schedulers; a minimal rate scheduler (SMRC) 202 and an excess rate scheduler (SERC) 204.

Each queue has an associated first token bucket 206 configured at the minimum rate guaranteed to the node and an associated second token bucket 208 configured at the difference between the maximum and the minimum rates of the node. SMRC scheduler 202 contains all non-empty queues (i.e., queues containing at least one actual packet). SERC scheduler 204 contains only non-empty queues which are eligible according to their second token buckets (i.e., queues that do not exceed their maximum rate minus their minimum rates).

The SMRC scheduler 202 is a combination of a rate-proportional work-conserving scheduler and a set of token buckets 206 (referred to above as the "first token buckets"), one per queue, configured with the minimal rates R(i). This combination makes SMRC scheduler 202 a rate controller which schedules queues based on minimum rates only if the queue does not exceed its minimum rate. Thus, service from SMRC is allowed only if tokens are available in this minimum rate bucket. If tokens are not available in the minimum rate bucket, the SERC scheduler 204 performs a dequeue from its eligible queues based on user-configurable rates. Excess bandwidth is thus shared in proportion to an arbitrary configured weight. The queues can be scheduled in the SERC scheduler 204 based on configurable rates because no queue will be serviced more than its minimum rate from the SMRC scheduler 202, and it will not exceed its maximum rate because its service by the SERC scheduler 204 is limited to the difference between its maximum and minimal rates, due to the second set of token buckets 208.

At each scheduling node, the SMRC scheduler 202 operates a binary search tree for use in scheduling the queues at that node. According to the present invention, this binary search tree has a specialized structure to optimize rapid and accurate scheduling. Use of this search tree improves the precision with which queues are returned to eligibility for scheduling in SMRC scheduler 202 after previously becoming ineligible. This has the effect of smoothing rate delivery and reducing burstiness since SMRC scheduler 202 will not have to catch up after a late return to eligibility of a queue by scheduling many consecutive transmissions from that queue. The structure and operation of this binary search tree will be set out in detail below. In one embodiment, SERC scheduler 204 operates a calendar queue at each scheduling node to schedule the queues at that node. Alternatively, SERC scheduler 204 also operates a similar binary search tree and accuracy of excess rate delivery is improved over that of the SERC embodiment that employs a calendar queue.

At the leaf level (furthest level from the root) in the hierarchy, the objects that are scheduled in the SMRC and SERC schedulers are the actual packet queues. At all other levels, an object scheduled in a search tree or calendar corresponds to a node in the class hierarchy at the next lower (further from the root) level. This node can be considered to be represented by a logical queue, where the logical queue, if non-empty, contains eligibility status (i.e., eligible or ineligible), as well as information used to identify the leaf queue and quantum of data on that leaf queue that represents the next quantum of data to be served from the logical queue. If any logical queue is scheduled in the SERC scheduler 204, then the queue has eligibility=eligible. Any logical queue that is currently eligible in its max-min token bucket and has at least one non-empty descendent leaf is scheduled in both SMRC and SERC schedulers 202, 204. A logical queue that is ineligible in its max-min token bucket but has at least one non-empty descendent leaf queue is scheduled in the SMRC scheduler 202 but not in the SERC scheduler 204. A logical queue that has no non-empty descendant leaves is not contained in either the SMRC or SERC scheduler. The SMRC scheduler 202 is preferably a work conserving scheduler with respect to eligible queues.

As described in detail below, SMRC scheduler 202 is first scheduled until either an eligible leaf queue or an ineligible node is reached. If an eligible queue is chosen, the packet is sent from that queue. If an ineligible node is chosen, the system 200 moves to the SERC scheduler 204 at the same point in the hierarchy where the ineligible dequeue occurred in SMRC scheduler 202, and an eligible node is dequeued from SERC scheduler 204. It is important to dequeue from the SERC scheduler at the same level of the hierarchy where the ineligible node was found in the SMRC scheduler, so as to ensure proper sharing of excess bandwidth throughout the hierarchy.

Figure 3:
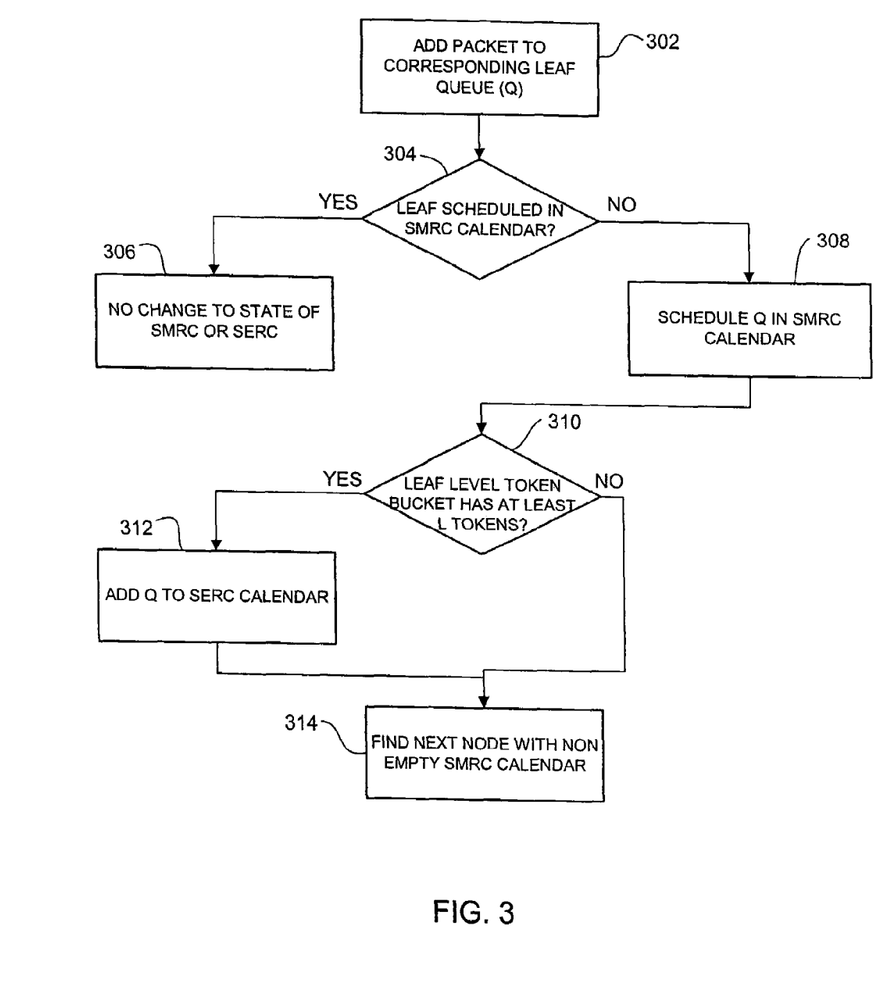
FIG. 3 is a flowchart describing steps of handling packet arrivals according to one embodiment of the present invention

The following describes an example of how the scheduling system 200 deals with packet arrivals, queuing, and dequeuing. FIG. 3 is a flowchart illustrating one example of how the scheduling system 200 adds packets to queues during packet arrival and FIG. 4 is a flowchart illustrating an example of dequeuing from the SMRC and SERC calendars.

Upon arrival of a packet, the scheduling system adds the packet to the corresponding leaf queue Q (step 302). If the leaf is already scheduled in the SMRC search tree at the leaf level, no further changes to the state of the SMRC or SERC take place (steps 304 and 306). If the leaf queue is not already in the SMRC search tree, the queue is inserted in a leaf-level SMRC search tree (step 308). If the leaf-level token bucket has at least L tokens (where L=packet size), Q is also added to the leaf-level SERC calendar or search tree (steps 310 and 312). The scheduling system then traverses the hierarchy toward the root until it finds a node already present in its SMRC search tree (step 314). At each level before that, when processing node N, the logical queue corresponding to N is added to the SMRC, and if N's token bucket has tokens, N is also added to the SERC calendar (or search tree). The logical packet is placed into this logical queue. Simultaneously, the logical packet and its corresponding logical queue are removed from the parent SMRC and SERC schedulers and the time to which the logical queue needs to be scheduled if the queue becomes busy again is stored with the logical queue. It should be noted that an alternate implementation optimizes out the back-to-back enqueue and dequeue by detecting that the hierarchy is empty and thus the packet can move quickly toward the root. But for simplicity, the non-optimized version is described here.

Figure 4:
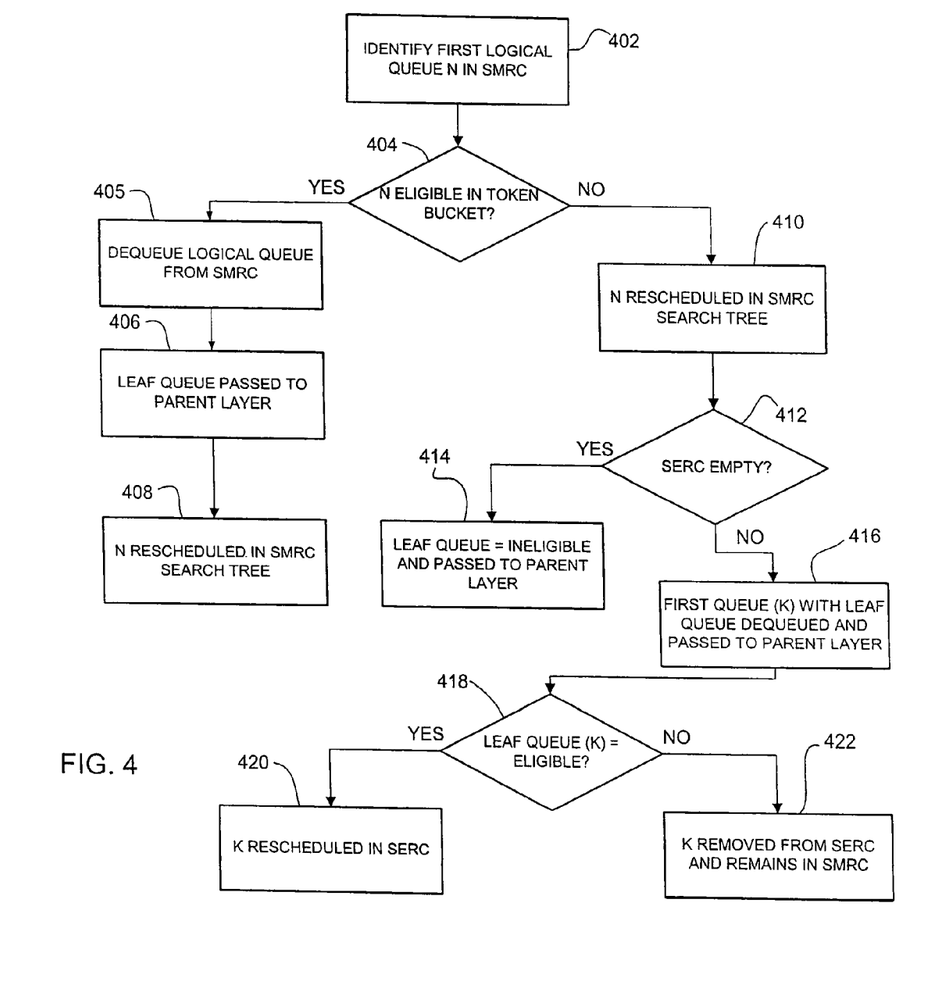
FIG. 4 is a flowchart describing steps of scheduling according to one embodiment of the present invention.

Referring now to FIG. 4, the scheduling system first traverses the SMRC search tree to identify the next logical queue N, among the queues at the root node 102 at step 402. If N is eligible in its own token bucket, and if the leaf queue contained in the logical queue N has eligibility=eligible, then the logical queue is dequeued (steps 404 and 405). In this case, the leaf queue is passed to the parent layer at step 406. Then, the logical queue N is repositioned in the SMRC search tree (based on the size of the packet), and the child layer is called to supply a new leaf queue to be placed in N (step 408).

If N is ineligible in its token bucket or its leaf queue has eligibility=ineligible, then N is repositioned in the SMRC search tree (based on packet length) (step 410). This entails traversing up the scheduling hierarchy to give a child system of N the chance to acquire more tokens and transition from ineligible to eligible if necessary. System 200 then checks the SERC calendar or search tree (step 412). If the SERC is empty, the eligibility of the leaf queue is set to ineligible, and the leaf queue is passed to the parent layer (step 414). The queue N keeps the old leaf queue and the current scheduling opportunity is completed. If the SERC is non-empty, the first queue K is de-queued and the leaf queue is passed to the parent layer (step 416). K's child layer is then invoked to provide new leaf queue information, and if the returned information represents an eligible queue, then K is rescheduled in the SERC based on the size M returned from K's child layer (steps 418 and 420). Otherwise, K is removed from the SERC and remains in the SMRC (step 422).

When a node has scheduled a queue N from the SMRC scheduler, tokens are removed from its minimum rate token bucket 206 in accordance with the length of the scheduled packet but the maximum rate minus minimum rate token bucket 208 is not debited. This may cause a queue to move from ineligible to eligible, leading to insertion of the queue into the SERC, where previously it was not present in the SERC. When a queue N is scheduled from either the SMRC scheduler or SERC scheduler, both token buckets are credited to add the number of tokens needed to account for the passage of time since the last update. If a logical queue becomes empty when dequeuing a logical packet in either the SMRC or SERC scheduler, the logical queue is removed from both schedulers.

The detailed operation of the SMRC and SERC schedulers at each node will now be discussed. As has been previously indicated, the SMRC scheduler is preferably implemented as a specialized binary search tree while the SERC scheduler can either be implemented as a calendar queue or as a similar binary search tree. The calendar queue implementation is described in the previously cited patent application entitled "Scheduling System and Method for Multi-Level Class Hierarchy." The binary search tree will be described in detail below.

In one implementation, both schedulers operate on virtual time. When a first packet arrives in a leaf queue, it is assigned a start time (or eligibility time) equivalent to the current virtual time. This first packet is also assigned a finish time (or deadline) equivalent to the start time plus the packet length over the rate assigned to the queue. For the SMRC this is the minimum rate. For the SERC, this rate is a function of the excess sharing weight. The next arriving packet is assigned an eligibility time equivalent to the deadline time of the previous packet and a finish time equivalent to this eligibility time plus the new packet length divided by the queue rate. These relationships are preserved among successive arriving packets so long as the queue is non-empty.

If a new packet arrives after the queue has been empty, this new packet is assigned an eligibility time that is the maximum of the last dequeued packet's finish time and the current time. The finish time is then the sum of this eligibility time and the current packet length divided by the queue rate.

At the leaf level of the hierarchy, the scheduler operating at each scheduling node uses the special binary search tree provided by embodiments of the present invention to select among the oldest packets, i.e., the packets at the head of each included queue. At times, it will be convenient in the discussion that follows to refer to this selection as being among queues. Each queue can be said to have an eligibility and deadline time equal to the packet at the head of the queue. At the other levels of the hierarchy, the schedulers select from among the logical queues as earlier described. When dequeuing, the SMRC and SERC schedulers operate to select, at each layer, the packet with the earliest virtual deadline time from among all the packets that have a virtual eligibility time that is equal or later than the current system virtual time.

Figure 5:
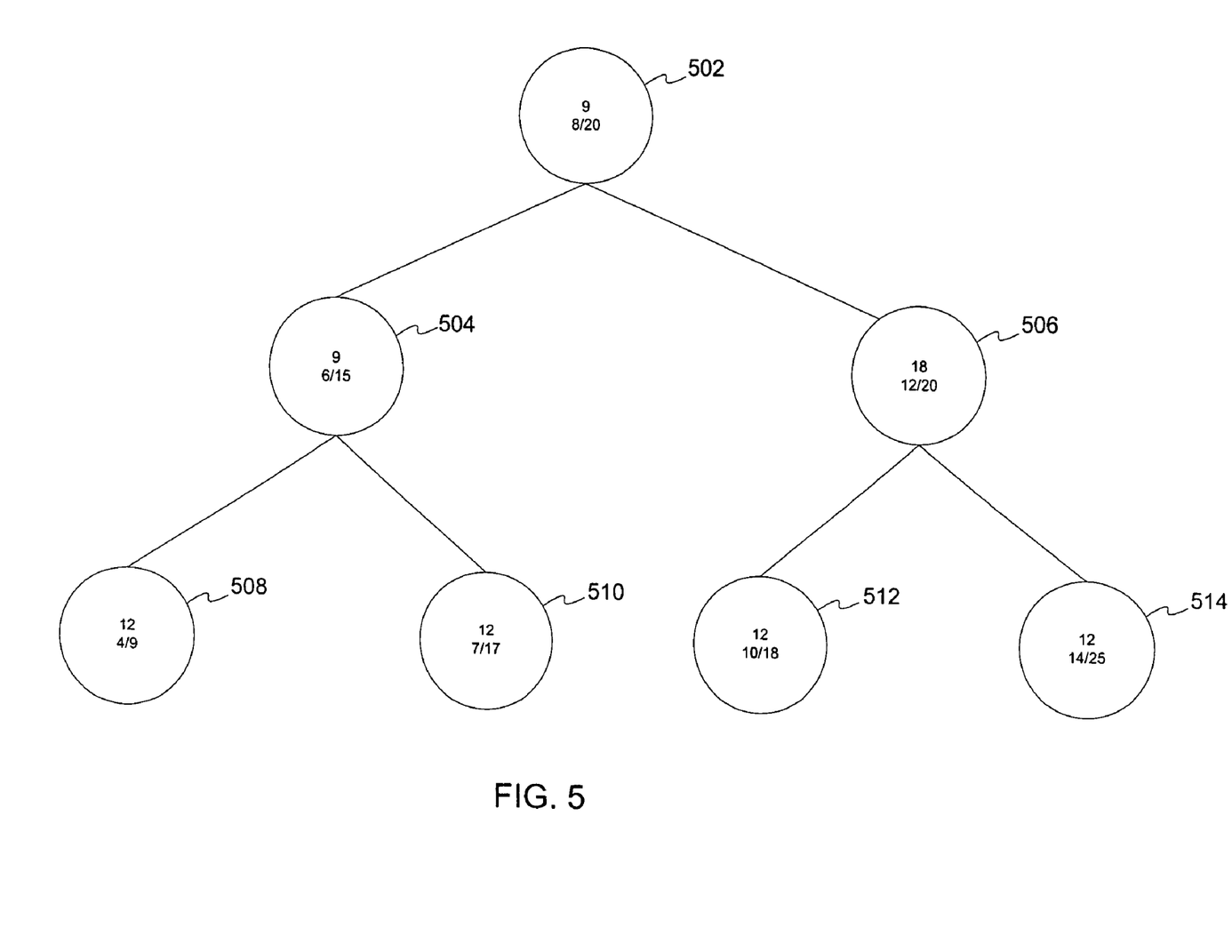
FIG. 5 depicts a binary search tree useful in operating the two-rate scheduling system of FIG. 2.

One embodiment of the present invention employs a specialized search tree structure described in Stoica, et al., "Earliest Eligible Virtual Deadline First: A Flexible and Accurate Mechanism for Proportional Share Resource Allocation," 1996, available as of Nov. 15, 2003 at http://www.cs.berkeley.edu/~istoica/pubs.html, the contents of which are herein incorporated by reference in their entirety for all purposes. FIG. 5 depicts such a binary search tree which may be referred to as an "earliest eligible deadline search tree." The tree structure depicted there is not to be confused with the scheduling hierarchy of FIG. 1. Rather the search tree of FIG. 5 can be used by any scheduling node to identify a logical queue or packet queue that has the earliest deadline time among queues having start times after the current time.

The representative search tree of FIG. 5 includes a root node 502 and its two child nodes 504 and 506. Node 504 has children nodes 508 and 510 and node 506 has child nodes 512 and 514. Each node has its virtual eligibility time and virtual deadline time marked as a/b. To facilitate efficient traversal of the search tree, each node also is marked with the earliest deadline time of any of its children nodes and itself. The tree is constructed such that the eligibility time of any parent node is later than or equal to the eligibility time of its left child node and earlier than the eligibility time of its right child node.

To find the eligible node with the earliest deadline, the search algorithm starts at the root node and proceeds down the tree as will be explained. Whenever the current virtual time is later than the eligible time of the currently visited node, the algorithm selects the right child node as the next node to visit, otherwise the left child node is the next node to visit. This results in a path from the root to a particular leaf node that divides the tree into two. All of the nodes on this path and to its left have eligible times later than or equal to the current virtual time. All of the nodes to the right of this path are ineligible. It is then straightforward to search the eligible nodes to find the earliest deadline by exploiting the information stored about the earliest deadline of its descendants. This is the preferred technique used by the SMRC at step 402 and by the SERC at step 416 if the SERC utilizes such a search tree rather than a calendar.

Insertion of nodes into the search tree structure of FIG. 5 will now be briefly discussed. Whenever arrival of a packet causes a previously empty leaf queue to be non-empty, a node will be added to the appropriate SMRC search tree to implement step 308. If the queue is eligible for inclusion in the SERC, a similar node may also be added to the appropriate SERC search tree to implement step 312. Logical queues are added to appropriate SMRC search trees during the execution of step 314. The rescheduling of queues in the SMRC at steps 408 and 410, and possibly in the SERC at step 420, also involves insertion of a node into an appropriate search tree (following removal of a node representing the previous scheduling state.) Furthermore, if binary search trees are used to implement the SERC, a node will be added to the appropriate SERC search tree whenever a queue becomes eligible there.

Node insertion into the binary tree structure of FIG. 5 is in accordance with standard binary search tree node insertion methodology. For example see Sedgewick, *Algorithms*, $2^{nd}$ Ed., Addison Wesley, 1989, Chapter 14, the contents of which are herein incorporated by reference in their entirety for all purposes. Nodes are inserted so as to preserve the required relationship between eligibility times of parent and children nodes. Also, the ancestors of newly inserted nodes update the minimum virtual deadline that they track for their descendants whenever a new descendant is inserted.

Search tree node deletion is invoked when a queue is dequeued such as at step 405 and 416. Deletions also may occur as a result of rescheduling such as at steps 408, 410, and 420. Furthermore, when a queue becomes ineligible in the SERC, its corresponding node in the appropriate SERC search tree will be deleted.

There are three possible deletion cases. A search tree leaf node may be deleted. A non-leaf node with one child may be deleted or a non-leaf node with two children may deleted. If a leaf node or a node with one child is deleted, the deletion algorithm removes the node and updates the minimum virtual deadline time of the affected ancestor nodes. If a node with two children is deleted, the deletion algorithm finds the successor of the node to be deleted (i.e., the node with smallest eligible time) later than the eligible time of the node to be deleted) and removes it from the tree by recursively calling the deletion algorithm. Due to the structure of the tree there is exactly one recursion. The node whose deletion is desired is replaced with its successor and the minimum virtual deadline times are updated accordingly.

This binary search tree operates very precisely. In particular, use of this search tree in the SMRC scheduler provides great precision in returning queues that are ineligible in the SERC scheduler to eligibility at the right time. It can be demonstrated that by use of this binary search tree, return to eligibility of a queue will be delayed by no more than L*packet_length/configured_minimum_rate. Smooth rate delivery is thus provided and burstiness in queue selection is avoided.

Use of the binary search tree in the SERC scheduler instead of calendar queues provides greater accuracy in control of excess bandwidth sharing. Furthermore, given that the search tree structure is being used for the SMRC scheduler, it is more convenient to use the same structure for the SERC structure.

In a further refinement of the above-described technique, the use of minimum rate token buckets may be avoided by employing real eligibility and finish times rather than virtual times in the SMRC scheduler search trees. The eligibility times of nodes as compared to the current real time then becomes the eligibility criterion for inclusion in the SERC scheduler.

Figure 6:
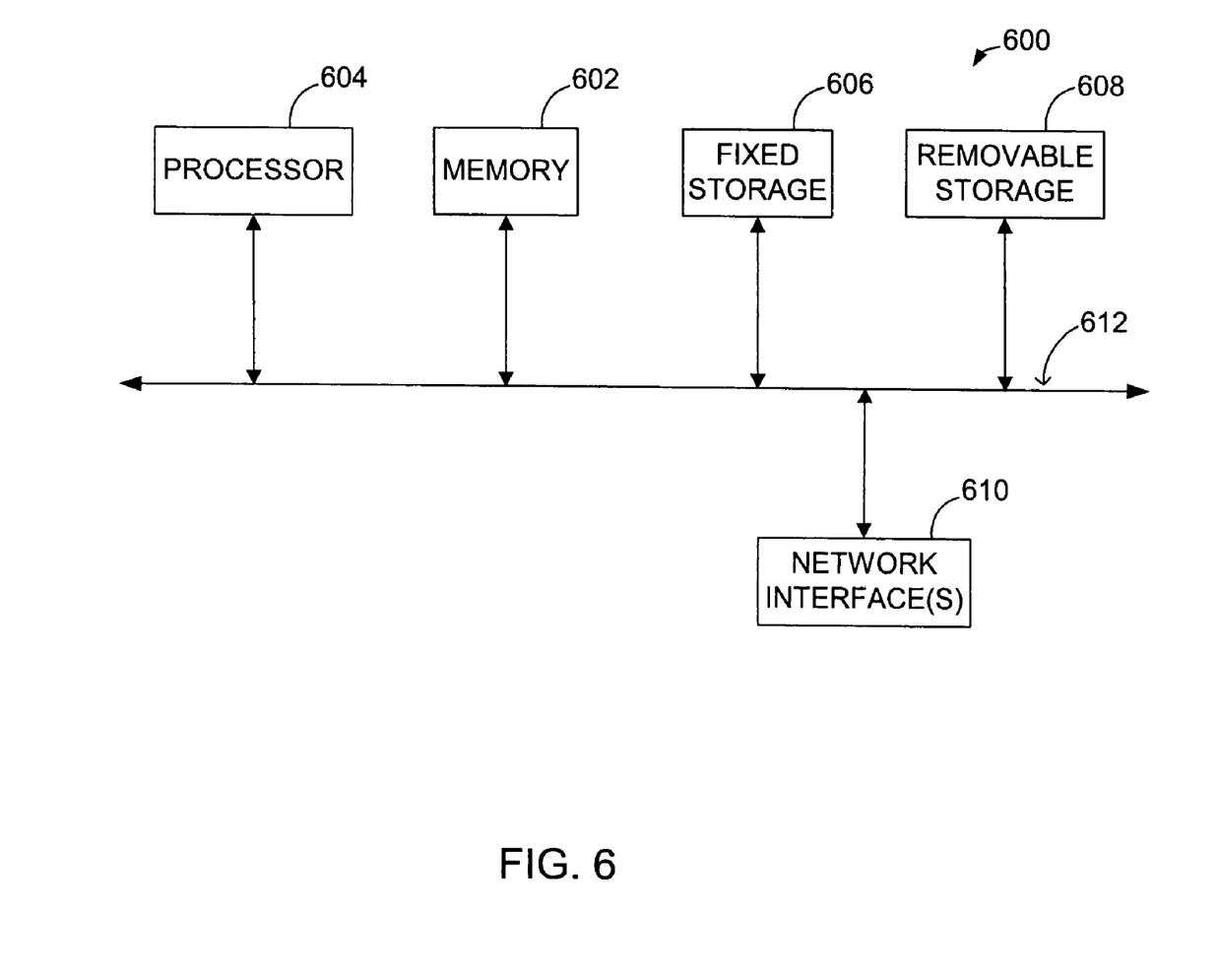
FIG. 6 depicts a computer system useful in implementing embodiments of the present invention.

FIG. 6 shows a system block diagram of computer system 600 that may be used to execute software of an embodiment of the invention. The computer system 600 includes memory 602 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 600 further includes subsystems such as a central processor 604, fixed storage 606, removable storage 608, and one or more network interfaces 610. Other computer systems suitable for use with the invention may include additional or fewer subsystems.

The system bus architecture of computer system 600 is represented by arrows 612 in FIG. 6. However, these arrows are only illustrative of one possible interconnection scheme serving to link the subsystems. For example, a local bus may be utilized to connect the central processor 604 to the system memory 602. Computer system 600 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network.

The invention claimed is:

1. A scheduling method for a multi-level class hierarchy having a plurality of layers, each layer containing a plurality of queues, the method comprising:

inserting all queues containing at least one packet in a first scheduler;

inserting into a second scheduler queues contained in the first scheduler that do not exceed their maximum rate;

dequeuing from the first scheduler until a queue exceeding a maximum rate of the queue is reached; and dequeuing from the second scheduler when a queue exceeding a maximum rate of the queue is reached in the first scheduler; and wherein the first scheduler employs a first binary search tree to make a dequeuing selection.

2. The method of claim 1 wherein the first binary search tree comprises a plurality of nodes corresponding to a plurality of queues.

3. The method of claim 2 further comprising storing, for each of the nodes an eligibility time, a deadline time, and an earliest deadline time of descendant nodes.

4. The method of claim 3 wherein the eligibility time, the deadline time, and the earliest deadline time are virtual times and the first scheduler comprises a work-conserving scheduler that is rate controlled by a first token bucket.

5. The method of claim 3 wherein the eligibility time, the deadline time, and the earliest deadline time are real times.

6. The method of claim 1 wherein the first binary search tree is constructed so that an eligible time of a parent node is between an eligible time of a first child node of said parent node and a second child node of the parent node.

7. The method of claim 1 wherein said second scheduler employs a second binary search tree to make a dequeuing selection.

8. The method of claim 1 wherein the first binary search tree comprises an earliest eligible deadline search tree.

9. A computer-readable storage medium encoded with a program for scheduling a multi-level class hierarchy having a plurality of layers, each layer containing a plurality of queues, the computer program comprising:
  code that causes insertion of all queues containing at least one packet in a first scheduler;
  code that causes insertion into a second scheduler of queues contained in the first scheduler that do not exceed their maximum rate;
  code that causes dequeuing from the first scheduler until a queue exceeding a maximum rate of the queue is reached; and
  code that causes dequeuing from the second scheduler when a queue exceeding a maximum rate of the queue is reached in the first scheduler;
  wherein the first scheduler employs a first binary search tree to make a dequeuing selection.

10. The computer-readable storage medium of claim 9 wherein the first binary search tree comprises a plurality of nodes corresponding to a plurality of queues.

11. The computer-readable storage medium of claim 10 further comprising code that causes storing, for each of said nodes of an eligibility time, a deadline time, and an earliest deadline time of descendant nodes.

12. The computer-readable storage medium of claim 11 wherein the eligibility time, the deadline time, and the earliest deadline time are virtual times and the first scheduler comprises a work-conserving scheduler that is rate controlled by a first token bucket.

13. The computer-readable storage medium of claim 11 wherein the eligibility time, the deadline time, and the earliest deadline time are real times.

14. The computer-readable storage medium of claim 9 wherein the first binary search tree is constructed so that an eligible time of a parent node is between an eligible time of a first child node of the parent node and a second child node of the parent node.

15. The computer-readable storage medium of claim 9 wherein the second scheduler employs a second binary search tree to make a dequeuing selection.

16. The computer-readable storage medium of claim 9 wherein the first binary search tree comprises an earliest eligible deadline search tree.

17. Apparatus for scheduling a multi-level class hierarchy having a plurality of layers, each layer containing a plurality of queues, the apparatus comprising:
  a processor; and
  memory storing instructions to be executed by the processor, said instructions comprising:
    code that causes insertion of all queues containing at least one packet in a first scheduler;
    code that causes insertion into a second scheduler of queues contained in the first scheduler that do not exceed their maximum rate;
    code that causes dequeuing from the first scheduler until a queue exceeding a maximum rate of the queue is reached; and
    code that causes dequeuing from the second scheduler when a queue exceeding a maximum rate of the queue is reached in the first scheduler; and
  wherein the first scheduler employs a first binary search tree to make a dequeuing selection.

18. The apparatus of claim 9 wherein the first binary search tree comprises a plurality of nodes corresponding to a plurality of queues.

19. The apparatus of claim 18 wherein said instructions further comprise code that causes storing, for each of said nodes of an eligibility time, a deadline time, and an earliest deadline time of descendant nodes.

20. The apparatus of claim 19 wherein the eligibility time, the deadline time, and the earliest deadline time are virtual times and the first scheduler comprises a work-conserving scheduler that is rate controlled by a first token bucket.

21. The apparatus of claim 19 wherein the eligibility time, the deadline time, and the earliest deadline time are real times.

22. The apparatus of claim 17 wherein the first binary search tree is constructed so that an eligible time of a parent node is between an eligible time of a first child node of the parent node and a second child node of the parent node.

23. The apparatus of claim 17 wherein the second scheduler employs a second binary search tree to make a dequeuing selection.

24. The apparatus of claim 17 wherein the first binary search tree comprises an earliest eligible deadline search tree.

25. Apparatus for scheduling a multi-level class hierarchy having a plurality of layers, each layer containing a plurality of queues, said apparatus comprising:
  means for inserting all queues containing at least one packet in a first scheduler;
  means for inserting into a second scheduler queues contained in the first scheduler that do not exceed their maximum rate;
  means for dequeuing from the first scheduler until a queue exceeding a maximum rate of the queue is reached; and
  means for dequeuing from the second scheduler when a queue exceeding a maximum rate of the queue is reached in the first scheduler; and
  wherein said first scheduler employs a first binary search tree to make a dequeuing selection.

* * * * *